United States Patent [19]

Yamashita

[11] Patent Number: 5,046,117

[45] Date of Patent: Sep. 3, 1991

[54] IMAGE DATA SCALING SYSTEM

[75] Inventor: Jun Yamashita, Iwatsuki, Japan

[73] Assignee: Fuji Xerox Co., Ltd., Saitama, Japan

[21] Appl. No.: 522,152

[22] Filed: May 11, 1990

[30] Foreign Application Priority Data

May 16, 1989 [JP] Japan .................................. 1-121896

[51] Int. Cl.$^5$ ............................................. G06K 9/00
[52] U.S. Cl. ..................................... 382/47; 358/425;
358/426; 358/428; 358/431; 358/451
[58] Field of Search .................. 382/47; 358/451, 425,
358/426, 428, 431; 340/728, 731

[56] References Cited

U.S. PATENT DOCUMENTS

| | | | |
|---|---|---|---|
| 4,792,856 | 12/1988 | Shiratsuchi | 358/180 |
| 4,879,666 | 11/1989 | Kembo | 364/519 |
| 4,885,786 | 12/1989 | Anderson et al. | 382/47 |
| 4,891,702 | 1/1990 | Nakayama et al. | 358/140 |

Primary Examiner—Michael Razavi
Assistant Examiner—Daniel Santos
Attorney, Agent, or Firm—Welsh & Katz, Ltd.

[57] ABSTRACT

An image-data scaling system in which a digital image data is subjected to a desired scale with respect to a main scanning direction to obtain a reduced or enlarged image data. The original image data is sequentially distributed to be sequentially stored into a plurality of memory means in synchronism with a data clock for the original image data. Image data stored in the plurality of memory means are parallelly read out on the basis of a read clock synchronized with the data clock and according to a desired scaling factor. The image data parallelly read out are partially or wholly extracted, or one or a plurality of interpolation image data are inserted between any selected adjacent image data, to thereby obtain an image data having the desired scaling factor.

16 Claims, 9 Drawing Sheets

IMAGE DATA SCALING SYSTEM

BACKGROUND OF THE INVENTION

1. Field of the Invention

The present invention relates to image-data scaling systems which can be suitably used in an image scanner, a digital copying machine, a facsimile machine, an image editing system and so on and, more particularly, to an image-data scaling system in which a digital image data is magnified or reduced to a desired size through digital logic processing with respect to a main scanning direction.

2. Description of the Related Art

As a prior art original-image scaling system, there is an optically scaling system. The prior art optical system however has had such defects that it is difficult to attain a wide range of scaling control and further accurate mechanisms are required for mechanical and optical adjustments, which causes the system to be made large in size and expensive in cost.

To avoid this, there have been recently suggested various sorts of scaling systems in which a unity original data is subjected to an electrical scaling operation to thereby obtain a data having a desired magnification. It is importantly demanded in these electrical scaling systems that the desired-scaled image data must be synchronized with the data clock of the original input image data at any magnification so that the desired-scaled image data can be obtained on a real time basis to thereby enable to process the scaled image data by a raster scanning type apparatus.

For the purpose of satisfying such a demand, there have been proposed such scaling systems as disclosed in Japanese Patent Appln. Laid-Open Nos. 62-256179, 62-257274 and 62-257275. These scaling systems are arranged mainly on a software basis, and more specifically, are arranged so that the position of a sampling point after scaling is first determined, a data of an original image in the vicinity of the new sampling point is picked up, a distance between the new sampling point and the picked-up original image data position is determined, and then a desired-scale image data is calculated on the basis of the distance and the picked-up original image data. With the above prior art systems, two RAMs are used so that while a data is written into one RAM, a data is read out from other other RAM, which is switched for every line.

Other exemplary prior art scaling systems are arranged so that the systems are mainly arranged on a hardware basis, i.e., so as basically to control the reading operation of a line memory in an enlargement mode and to control the writing operation of the line memory in a reduction mode, as disclosed in Japanese Patent Appln. Laid-Open Nos. 63-48064 and 63-82168. Even in these systems, two RAMs are used so that while a data is written into one RAM, a data is read out from the other RAM, which is alternately repeated.

In this way, the prior art optical scaling systems have had such defects that any of the systems becomes large in size, high in cost and narrow in scaling range, and also that the system circuit becomes large in scale and expensive because of different processing methods for scaling factors above 100% and below 100%.

SUMMARY OF THE INVENTION

It is an object of the present invention to provide a image data scaling system which is small in size and inexpensive, and also to provide its method of operation.

Another object of the present invention is to provide a scaling system and method which can perform the same processing for scaling factors above and below 100%.

A further object of the present invention is to provide a scaling system and method which has a wide scaling range.

In accordance with the present invention, the above object is attained by sequentially distributing an original image data on its image element basis to be written into a plurality of memory means, parallelly reading out image data written in the plurality of memory means at a speed corresponding to a desired scaling factor, and subjecting the parallelly read-out image data to a predetermined thin-out or interpolating operation to thereby form a image data having the desired magnification.

In this case, the plurality of memory means may comprise, for example, first-in first-out memories which eliminate the need for any external addresses.

The reading of image data from the plurality of memory means is carried out on the basis of a carry signal which is generated based on the accumulation of the data corresponding to the desired scaling factor in synchronism with the data clock of the original image data.

The original image data is sequentially distributed in synchronism with the data clock of the original image data and sequentially stored into the plurality of memory means. The image data stored in the plurality of memory means are parallelly read out on the basis of the read clock synchronized with the data clock, i.e., on the basis of the above carry signal. The parallelly read-out image data are partially or wholly extracted, or one or a plurality of interpolation image data are inserted between any selected adjacent image data to thereby form a image data having the desired scaling factor.

In this way, an accurate data having any scaling factor and synchronized with the data clock of the original image data can be obtained with a simple and small-scaled arrangement. Further, basically the same processing can be used with respect to scaling factors of above and below 10%. In addition, since the image memories may comprise FIFO memories, this can fully eliminate the need for address control and simplify the arrangement.

BRIEF DESCRIPTION OF THE DRAWINGS

FIGS. 7 to 11 are timing charts for explaining the operation of the system of FIG. 1 when scaling factors are 100%, 25%, 400%, 35.4% and 282.8%, respectively.

DESCRIPTION OF THE PREFERRED EMBODIMENTS

Figure 1:
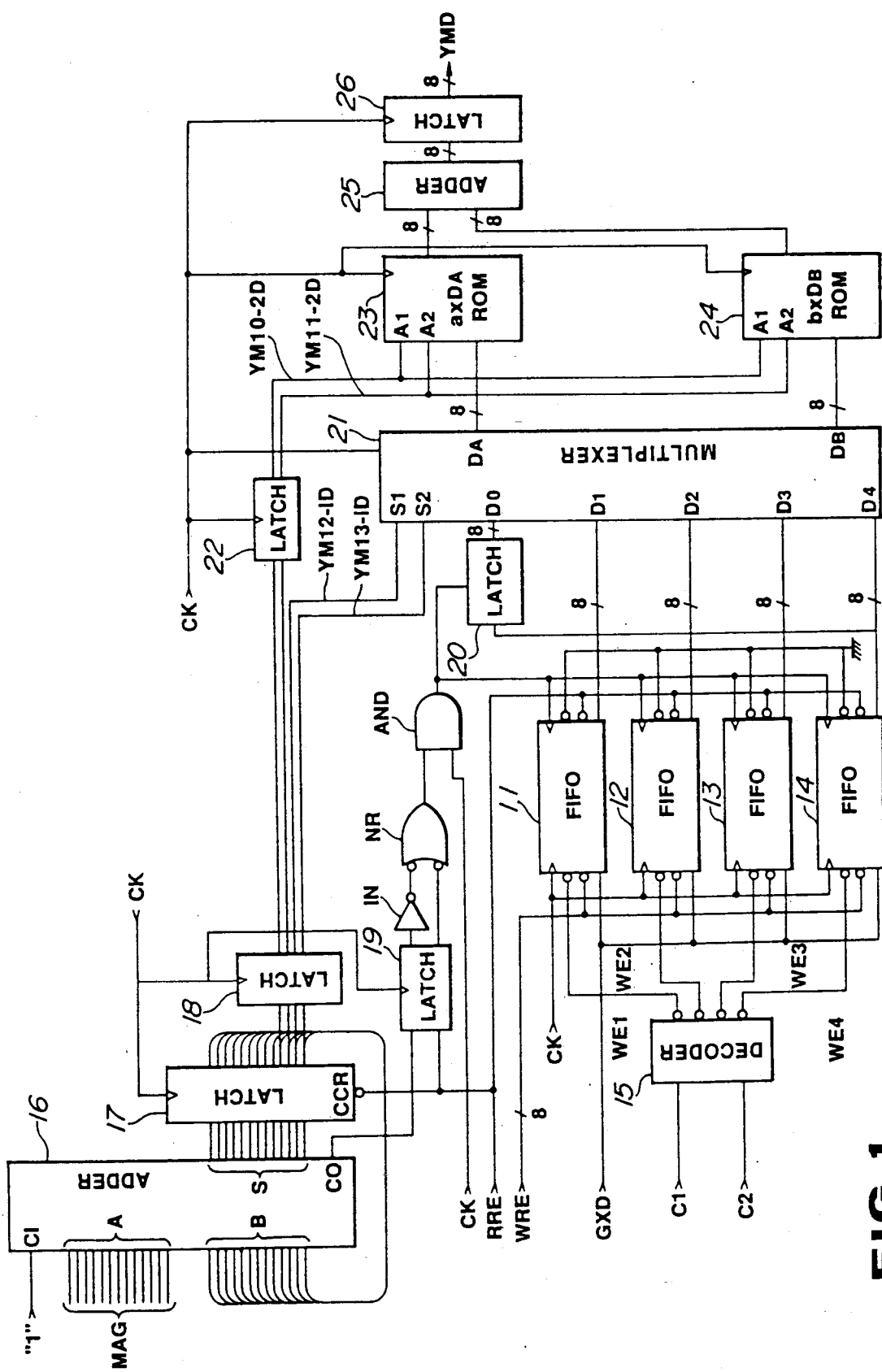
FIG. 1 is a block diagram showing an embodiment of an image-data scaling system in accordance with the present invention.

Referring first to FIG. 1, there is shown, in a block diagram form, an embodiment of an image-data scaling system in accordance with the present invention. The system of the embodiment is arranged so that a scaling factor is set or determined by a scaling data MAG and an image input data GXD is subjected to a scaling operation based on the scaling factor of the data MAG to be thereby output as a desired-scale image data YMD having a scale in its main scanning direction. In this case, the scaling operation in its sub-scanning direction is carreid out, for example, by controlling the feed speed of the sub-scanning direction.

The original image data GXD is applied to image memories 11, 12, 13 and 14 in parallel therewith. In the illustrated example, the original image data GXD comprises a multi-valued image data of image elements each expressed by an 8-bit tone data.

The image memories 11, 12, 13 and 14 each comprise a first-in first-out (FIFO) memory. As is well known, the FIFO memory does not require any external address at all. These image memories 11, 12, 13 and 14, prior to subjection of the image data GXD to the writing operation, are reset with respect to their writing position of the write side and their reading position of the read side. This resetting is carried out by means of a write reset signal WRE and a read reset signal RRE.

The image elements of the original data image GXD are sequentially distributed to and written into the image memories 11, 12, 13 and 14. The write distribution of the original image data GXD is effected under control of an output of a decoder 15. The decoder 15 functions to receive two-bit signals C1 and C2 in synchronism with a data clock CK of the original image data GXD, decode the received signals C1 and C2 and then output four control signals WE1 to WE4 for the above distribution. The four control signals WE1 to WE4 are applied to respective write control terminals of the image memories 11, 12, 13 and 14 to control the writing operation of the respective memories 11, 12, 13 and 14.

Figure 2:
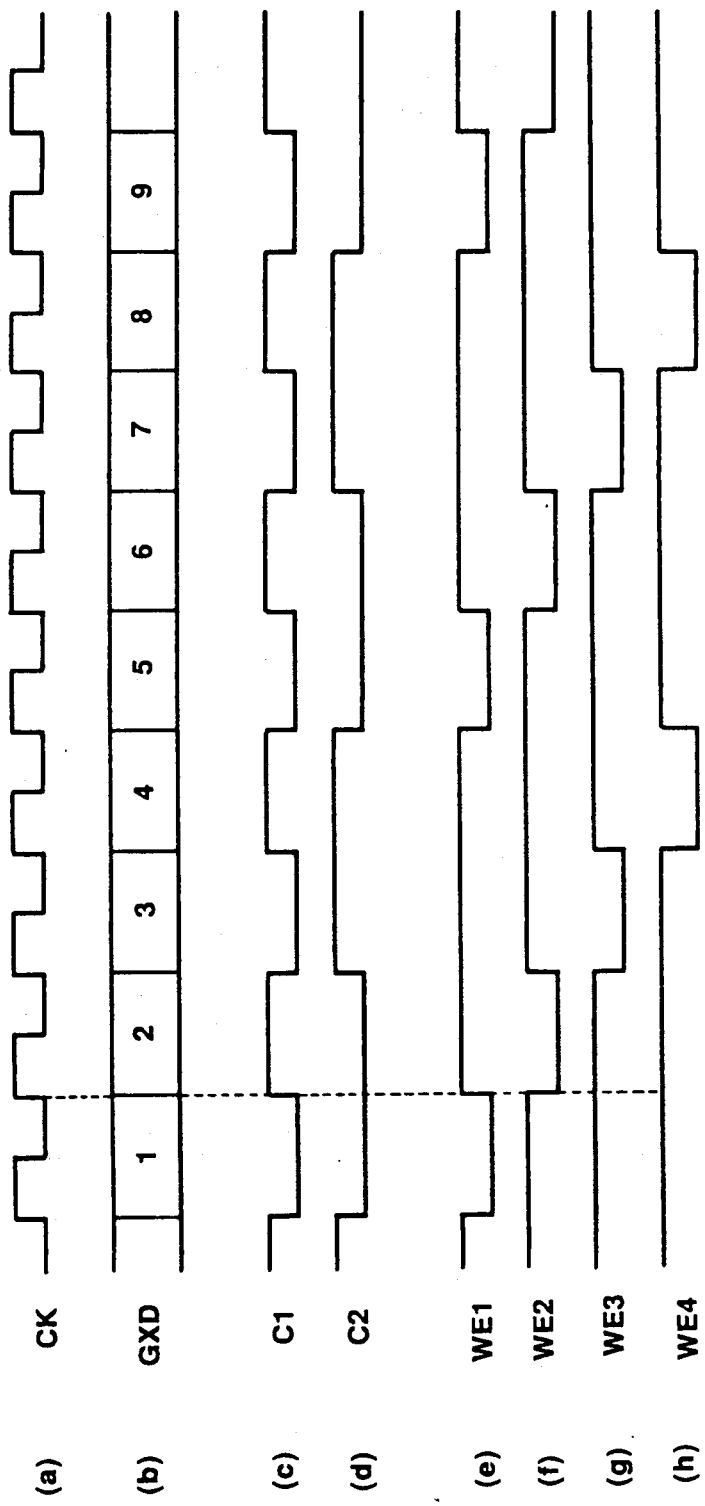
FIG. 2 is a timing chart for explaining the writing operation of an original image data into an image memory in the embodiment of FIG. 1.

Shown in FIG. 2 is a timing chart for explaining timing relationship between the aforementioned data clock CK, original image data GXD, 2-bit signals C1 and C2, and control signals WE1 to WE4. The original image data GXD (FIG. 2(b)) is applied to the image memories 11, 12, 13 and 14 in parallel therewith in synchronism with the data clock CK (FIG. 2(a)). In the drawing, numbers given in the original image input data GXD denote the order of image elements in the data GXD to be subjected to a scaling. For example, the number "1" denotes one of the image elements of the image data which is located at the head of the effective range of the image data to be clipped for the scaling operation. The number "2" denotes one of the image elements following the image element "1", followed sequentially by the image elements "3", "4", "5", ...

The 2-bit signals C1 and C2 to be applied to the decoder 15 are shown in FIG. 2(c) and (d). The 2-bit signals C1 and C2 are decoded at the decoder 15 to obtain such control signals WE1 to WE4 as shown in FIG. 2(e) to (h). In the illustrated example, since the control signal WE1 is applied to a write control terminal of the image memory 11, the signal WE1 becomes low level at timings of the the original image input data GXD corresponding to its image elements "1", "5", "9", ... The control signal WE2, which is applied to a write control terminal of the image memory 12, has its low level at timings of the original image input data GXD corresponding to its image elements "2", "6", ... The control signal WE3 applied to a write control terminal of the original image memory 13 has its low level at timings af the original image input data GXD corresponding to its image elements "3", "7", ... Finally, the control signal WE4, which is applied to a write control terminal of the image memory 14, becomes its low level at timings of the original image input data GXD corresponding to its image elements "4", "8", ...

Figure 3:
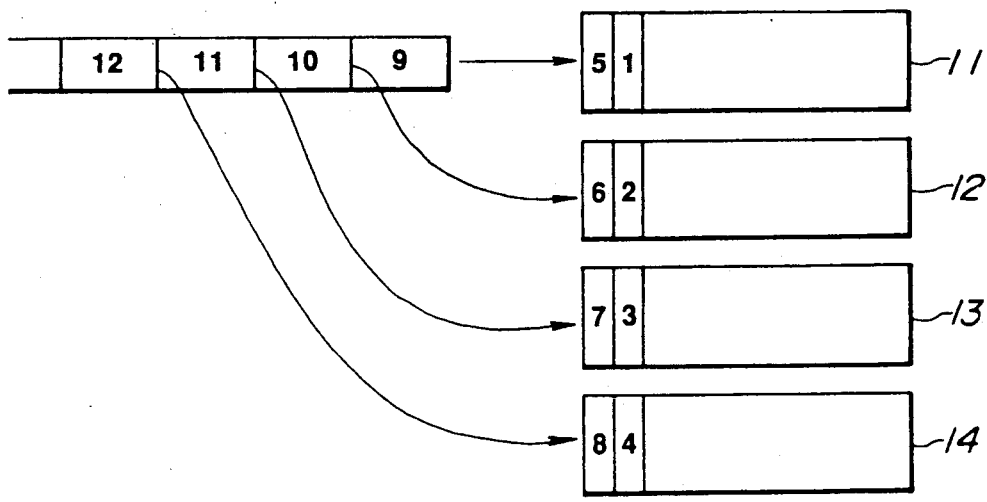
FIG. 3 is a diagram for explaining the writing operation of the original image data into the image memory.

FIG. 3 shows how the original image input data GXD is distributed according to the respective signals shown in the timing chart of FIG. 2. The image elements "1" to "4" of the original image input data GXD, i.e., the head image element "1" to the fourth image element "4", are first distributed to the image memories 11, 12, 13 and 14 and written thereinto, and then the subsequent image elements "5" to "8" are similarly distributed and written into the image memories 11, 12, 13 and 14. Thereafter, in this manner, the respective image element data of the original image input data GXD are sequentially distributed and written into the image memories 11, 12, 13 and 14. This writing operation is carried out in synchronism with the data clock CK synchronized with the respective image elements.

Meanwhile, the scaling data MAG determining the scaling factor of the present embodiment is input to an adder 16, which, when receiving the scaling data MAG, accumulates the scaling data MAG in synchronism with the data clock CK, and on the basis of a carry signal from its carry output CO of the adder 16, generates a read clock RCK for reading out the respective image element data from the image memories 11, 12, 13 and 14. It will be clear from the following explanation that the scaling factor in the scaling operation of the original image input data GXD is controlled by the read clock RCK.

The scaling data MAG determining the scaling factor of the original image input data GXD is applied to an input A of the adder 16. The adder 16 is applied at its carry input CI with a signal "1" and also at its input B with an output data of a latch circuit 17 for latching an addition output of the adder 16. The latch circuit 17 is reset by the read reset signal RRE. When the reset state of the latch circuit 17 by the read reset signal RRE is released, the adder 16 adds a sum (MAG+1) of the signal "1" and the scaling data MAG applied to the input A to the output data of the latch circuit 17 applied to the input B to obtain an addition value, outputs the addition value from its addition output S to the latch circuit 17, which results in that the value (MAG+1) is accumulated in synchronism with the data clock CK applied to the latch circuit 17 and thus values (MAG+1), 2(MAG+1), 3(MAG+1), ... are sequentially calculated.

Figure 4:
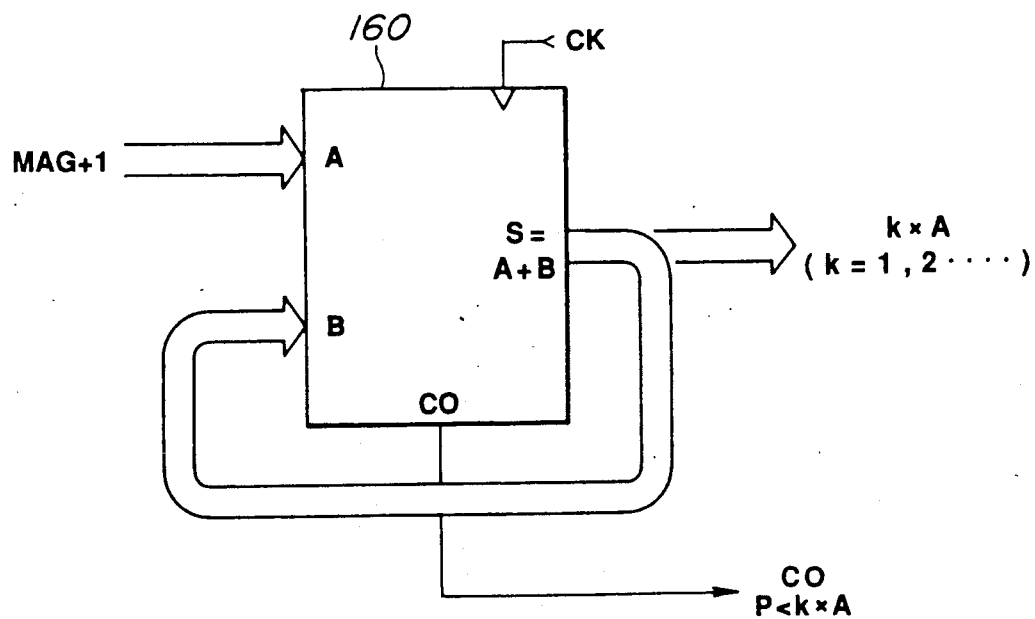
FIG. 4 is a block diagram for explaining the operation of adders and latch circuits shown in FIG. 1.

FIG. 4 is a block diagram for explaining the operation of the adder 16 and the latch circuit 17. As shown in FIG. 4, the adder 16 and latch circuit 17 in FIG. 4 may be expressed in the form of a single accumulator 160 which is operated in synchronism with the data clock CK. The accumulator 160 acts to accumulate the value (MAG+1) applied to its input A in synchronism with the data clock CK and sequentially generate data corresponding to values $k \times A$ ($k = 1, 2, 3 ...$) from its addition output S when (MAG+1)=A. And when the accumulated value of the accumulator 160 exceeds its upper limit value, that is, its accumulation capacity value P (P>k×A), the accumulator 160 outputs a carry signal from its carry output terminal CO. In other words, the accumulator 160, each time the accumulated value (k×A) exceeds values P, 2P, 3P, . . . , outputs the carry signal from its carry output CO. Here, how often the carry signal is generated from the accumulator 160, i.e., the carry-signal generation frequency depends on the scaling data MAG. That is, the larger the value of the scaling data MAG is the higher the carry-signal generation frequency is, whereas the smaller the value of the scaling data MAG is the lower the carry-signal generation frequency is. In the present embodiment, the reading out operation of data corresponding to the respective image elements from the image memories 11, 12, 13 and 14 is controlled on the basis of the above carry signal.

Explanation will next be directed to the details of the scaling data MAG and the adder 16 used in the embodiment of FIG. 1.

The scaling data MAG applied to the adder 16 comprises 13 bit parallel binary signals. The adder 16 comprises a 13-bit adder which functions to add together the scaling data MAG applied to its input A and the 13-bit data applied to another input B. The adder 16 also has the carry input CI and a carry output CO. Constantly applied to the carry input terminal CI is the signal "1". The adder 16 outputs and 13-bit addition value from its addition output terminal S to the 13-bit latch circuit 17. 13 bit signals YM1 to YM13 latched at the latch circuit 17 are applied back to the input B of the adder 16.

Table 1 shows examples of the scaling data MAG to be applied to the adder 16.

TABLE 1

| MAG | Scale | |
|---|---|---|
| 1FF | 800/(1FF + 1) | 400% |
| 200 | 800/(200 + 1) | |
| 201 | 800/(201 + 1) | |
| 7FE | 800/(7FE + 1) | |
| 7FF | 800/(7FF + 1) | 100% |
| 800 | 800/(800 + 1) | |
| 801 | 800/(801 + 1) | |
| 1FFD | 800/(1FFD + 1) | |
| 1FFE | 800/(1FFE + 1) | |
| 1FFF | 800/(1FFF + 1) | 25% |

In Table 1, the scaling data MAG is expressed in terms of hexadecimal notation. In the present embodiment, if the scaling data MAG is, for example, "7FF" in hexadecimal notation, then the value "7FF" is added to the signal "1" applied to carry input CI so that the adder 16 accumulates 7FF+1=800 in synchronism with the data clock CK. When the adder 16 reaches "2000" in hexadecimal notation, the adder outputs a carry signal from its carry output terminal CO. That is, the adder 16, when receiving the four (2000/800=4) clocks CK, outputs the single carry signal. At this time, the scaling factor is set to be 100% (800/(7FF+1)). When the scaling data MAG is a hexadecimal number "1FF", the adder 16 accumulates 1FF+1= ⓑ in synchronism with the data clock CK, in which case the adder 16 outputs the single carry signal for the 16 clocks CK and at this time the scale is set to be 400% (800/(1FF+1)). When the scaling data MAG is "1FFF" in decimal notation, the adder 16 accumulates 2000=(≠1FFF+1) in synchronism with the clock CK, in which case the adder 16 outputs the single carry signal for the single clock CK and at this time the scale is set to be 25% (800/(1FFF+1)).

The carry signal issued from the carry output terminal CO of the adder 16 is applied to an NOR circuit NR via a latch circuit 19 which latches its input signal in synchronism with the data clock CK and also via an inverter IN. The NOR circuit NR also receives at the other input terminal the read reset signal RRE through the latch circuit 19. An output of the NOR circuit NR is applied to an AND circuit AND which in turn receives the data clock CK at the other input terminal. Therefore, when the output of the latch circuit 19 is at low level for the read reset signal RRE, the AND circuit AND outputs the clock signal CK as it is without any change; while, when the output of the latch circuit 19 is at high level for the read reset signal RRE, the adder 16 generates the carry signal from its carry output terminal CO and therefore the output of the AND circuit AND becomes high level at every circuit to which the AND circuit AND outputs the single clock signal CK. An output of the AND circuit AND is sent as a read clock RCK to read control terminals of the image memories 11, 12, 13 and 14 and also to a latch circuit 20 as a latch signal.

The image memories 11, 12, 13 and 14, each time receiving the read clock RCK from the AND circuit AND, output memory data parallelly on an image-element basis. The image memories 11, 12, 13 and 14 of each FIFO type, as mentioned earlier, are arranged so that a data first inputted from the input side of the memory is read out from the associated memory earlier than later input data. In the illustrated example, the image memories 11, 12, 13 and 14 function as buffer memories.

Data read out from the image memories 11, 12, 13 and 14 are applied to input terminals $D_1$, $D_2$, $D_3$ and $D_4$, respectively, of a multiplexer 21 having an output latch. The data read out from the image memory 14 is applied also to the latch circuit 20, which in turn is latched when receiving the output from the AND circuit AND. The data latched at the latch circuit 20 is applied to the input terminal $D_0$ of the multiplexer 21.

Accordingly, at a timing when the first read-out clock RCK from the AND circuit AND is generated, the data of the first image element "1" read out from the image memory 11 is input to the input $D_1$ of the multiplexer 21, the data of the second image element "2" read out from the image memory 12 is input to the input $D_2$ of the multiplexer 21, the data of the third image element "3" read out from the image memory 13 is input to the input $D_3$ of the multiplexer 21, and the data of the fourth image element "4" read out from the image memory 14 is input to the input $D_4$ of the multiplexer 21. At this time, the data indicative of the fourth image element "4" read out from the image memory 14 is also latched at the latch circuit 20.

When the next read clock RCK is generated from the AND circuit AND, the data of the fourth image element "4" latched at the latch circuit 20 is applied to the input $D_0$ of the multiplexer 21 in synchronism with the generation of the clock RCK so that data corresponding to the next image elements "5", "6", "7" and "8" are applied to the inputs $D_1$, $D_2$, $D_3$ and $D_4$ of the multiplexer 21, respectively. At this time, the data indicative of the eighth image element "8" read out from the image memory 14 is latched at the latch circuit 20.

In this way, each time the read clock RCK is generated from the AND circuit AND, the respective data of the image elements read out from the image elements 11, 12, 13 and 14, as well as the data of the image element latched at the latch circuit 20, are input to the multiplexer 21.

Of the data signals YM1 to YM13 issued from 17 in synchronism with the clock CK, the upper bit signals YM10, YM11, YM12 and YM13 are latched at a latch circuit 18 at the timing of the clock CK. Of the upper bit signals latched at the latch circuit 18, the 2 upper bit signals are applied to control input terminals $S_1$ and $S_2$ of the multiplexer 21 as one-bit delay signals YM12-1D and YM13-1D of the signals YM12 and YM13. Of the signals latched at the latch circuit 18, the other 2 lower bit signals are again latched at a latch circuit 22, and are applied to address terminals A1 and A2 of read-only memories (ROMs) 23 and 24 as 2 bit delay signals YM10-2D and YM11-2D of the signals YM10 and YM11, respectively.

The multiplexer 21, on the basis of the signals YM12-1D and YM13-1D received at its control input terminals $S_1$ and $S_2$, distributes the data received at its input terminals $D_0$ to $D_4$ to its output terminals DA or DB and outputs them from the output terminals as delayed by one clock. Relationships between the signals applied to the control input terminals $S_1$ and $S_2$ of the multiplexer 21 and the data distributed to the output terminals DA and DB are as shown in Table 2 below.

TABLE 2

| $S_1$ | $S_2$ | DA | DB |
|---|---|---|---|
| 0 | 0 | $D_0$ | $D_1$ |
| 1 | 0 | $D_1$ | $D_2$ |
| 0 | 1 | $D_2$ | $D_3$ |
| 1 | 1 | $D_3$ | $D_4$ |

That is, the multiplexer 21, when receiving the signals of "0" and "0" at the control input terminals $S_1$ and $S_2$, guides the data received at the input terminal $D_0$ to the output terminal DA and the data received at the input terminal $D_1$ to the output terminal DB. Meanwhile, the multiplexer 21, when receiving the signals of "1" and "0" at the control input terminals $S_1$ and $S_2$, guides the data received at the input terminal $D_1$ to the output terminal DA and the data received at the input terminal $D_2$ to the output terminal DB. The multiplexer 21, when receiving the signals of "0" and "1" at the control input terminals $S_1$ and $S_2$, guides the data received at the input terminal $D_2$ to the output terminal DA and the data received at the input terminal $D_3$ to the output terminal DB. Finally, the multiplexer 21, when receiving the signals of "1" and "1" at the control input terminals $S_1$ and $S_2$, guides the data received at the input terminal $D_3$ to the output terminal DA and the data received at the input terminal $D_4$ to the output terminal DB.

Figure 5:
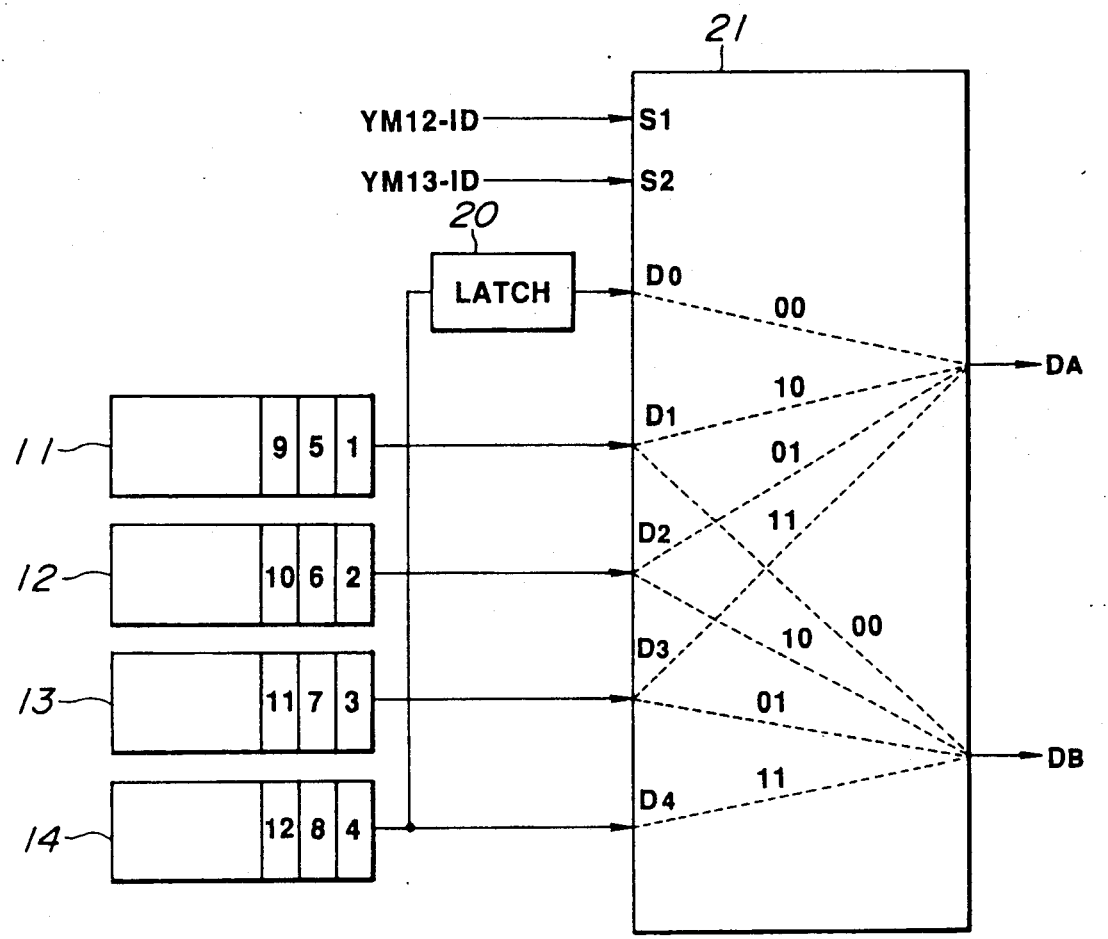
FIG. 5 is a block diagram for explaining the operation of a multiplexer shown in FIG. 1.

The operation of the above multiplexer 21 is shown in FIG. 5, in which dotted lines depicted in the multiplexer 21 show how the data received at its input terminals are distributed to the output terminals, and numerals attached to the dotted lines denote the contents of the control data $S_1$ and $S_2$. More in detail, when the control data $S_1$ and $S_2$ are "1" and "0" for example, the data received at the input terminal $D_1$ is guided to the output terminal DA while the data received at the input terminal $D_2$ is guided to the output terminal DB. For example, in the case where the data of the image elements "1", "2", "3" and "4" are read out from the image memories 11, 12, 13 and 14 and applied to the inputs $D_1$ to $D_4$ of the multiplexer 21, which also receives the signals "0" and "1" at the control inputs $S_1$ and $S_2$; the data of the image element "2" received at the input $D_2$ is guided to the output DA while the data of the image element "3" received at the input $D_3$ is guided to the output $D_3$. At this time, the data applied to the inputs $D_0$, $D_1$ and $D_4$ are not output from the multiplexer 21.

As will be clear from the above explanation, the data signals issued from the output terminals DA and DB of the multiplexer 21 indicate mutually adjacent image elements and thus, if necessary, the following interpolating operation to be explained below is carried out on the basis of the adjacent image element data.

That is, the data issued from the output terminals DA and DB of the multiplexer 21 are applied to the read-only memories (ROMs) 23 and 24 having output latches respectively.

The ROMs 23 and 24 store as addresses the output signal of the latch circuit 22 as well as the output data from the output terminals DA and DB of the multiplexer 21, both multiplied by predetermined coefficients a and b, and output these stored values as delayed by one clock in response to the output of the latch circuit 22 and multiplexer 21. Shown in Table 3 below are relationships between the count values a and b stored at the ROMs 23 and 24, as well as the outputs of the latch circuit 22, i.e., the signals applied to the input terminals A1 and A2 of the ROMs 23 and 24.

TABLE 3

| A1 | A2 | a | b |
|---|---|---|---|
| 0 | 0 | 1 | 0 |
| 1 | 0 | 0.75 | 0.25 |
| 0 | 1 | 0.5 | 0.5 |
| 1 | 1 | 0.25 | 0.75 |

As will be clear from Table 3, when the signals of "0" and "0" are applied to the input terminals A1 and A2 of the ROMs 23 and 24, the ROM 23 outputs a value corresponding to the multiplication of the received data by "1", while the ROM 24 outputs a value corresponding to the multiplication of the received data by "0". When the signals of "1" and "0" are applied to the input terminals A1 and A2, the ROM 23 outputs a value corresponding to the multiplication of the received data by "0.75", while the ROM 24 outputs a value corresponding to the multiplication of the received data by "0.25". Further, when the signals of "0" and "1" are applied to the input terminals A1 and A2, the ROM 23 outputs a value corresponding to the multiplication of the received data by "0.5", while the ROM 24 outputs a value corresponding to the multiplication of the received data by "0.5". Finally, when the signals of "1" and "1" are applied to the input terminals A1 and A2, the ROM 23 outputs a value corresponding to the multiplication of the received data by "0.25", while the ROM 24 outputs a value corresponding to the multiplication of the received data by "0.75". In the illustrated example, a sum (a+b) of the count a subjected to the multiplication at the ROM 23 and the count b subjected to the multiplication at the ROM 24 is designed to be always 1.

Outputs of the ROMs 23 and 24 are applied to an adder 25 to be added together thereat. The operation of the ROMs 23 and 24 and adder 25 corresponds to the interpolating operation between the mutually adjacent data issued from the output terminals DA and DB.

Figure 6:
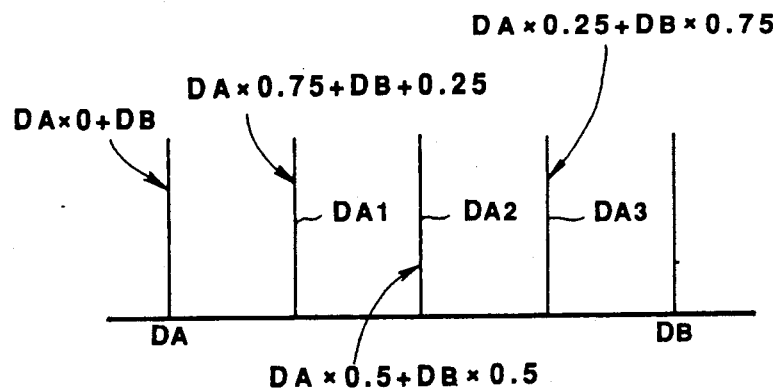
FIG. 6 is a diagram for explaining the interpolating operation of the embodiment of FIG. 1.

Consider a case where, for example, the mutually adjacent data DA and DB are to be subjected to an interpolating operation to generate three data DA1, DA2 and DA3, as shown in FIG. 6. In this case, the data DA2 is an intermediate value between the data DA and DA2, the data DA1 is an intermediate value between the data DA and DA2, and the data DA3 is an intermediate value between the data DA2 and DB. For example, in generating the data DA2, the signals of "0" and "1" are applied to the input terminals A and B of the ROMs 23 and 24 to cause the ROMs 23 and 24 and adder 25 to perform substantially an operation of $DA \times 0.5 + DB \times 0.5$ to thereby obtain the data DA2. In generating the data DA1, the signals of "1" and "0" are applied to the input terminals A and B of the ROMs 23 and 24 to cause the ROMs 23 and 24 and adder 25 to perform substantially an operation of $DA \times 0.75 + DB \times 0.25$ to thereby obtain the data DA1. In generating the data DA3, the signals of "1" and "1" are applied to the input terminals A and B of the ROMs 23 and 24 to cause the ROMs 23 and 24 and adder 25 to perform substantially an operation of $DA \times 0.25 + DB \times 0.75$ to thereby obtain the data DA1.

Explanation will next be made more in detail as to the operation of the system of FIG. 1 in connection with scales of 100, 25, 400, 35.4 and 282.8% by referring to the timing charts of FIGS. 7 to 11.

100% SCALING FACTOR

Figure 7:
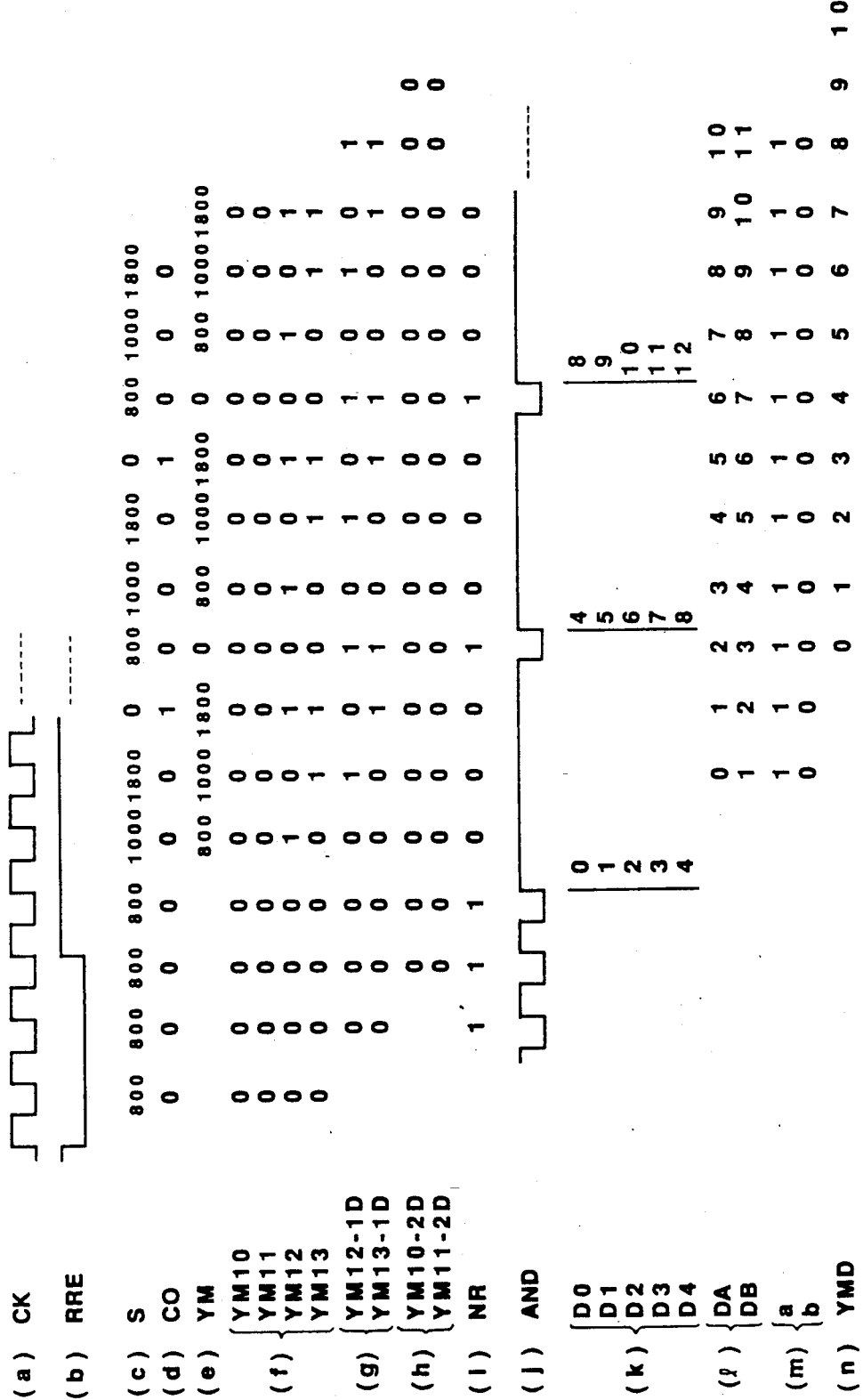

In the case of a scaling factor of 100%, the operation or waveforms of signals appearing at various points are as shown in FIG. 7. In this case, the scaling data MAG is set at 7FF in hexadecimal notation so that a signal of 13 bits "0011111111111111" corresponding to the hexadecimal "7FF" is applied to the input terminal A of the adder 16. First, in a state before image data are read out from the image memories 11, 12, 13 and 14, the contents of the latch circuit 17 is previously cleared by means of the read reset signal RRE (refer to FIG. 7(d)). Thus, the 13 bits of a signal applied to the input terminal B of the adder 16 are all "0", at which time the adder 16 outputs from the output terminal S a signal indicative of a hexadecimal "7FF+1=800" that corresponds to an addition of the signal at the input terminal A to "1" (refer to FIG. 7(c)).

Further, the read reset signal RRE is also applied to read reset terminals of the image memories 11, 12, 13 and 14 to reset the read-out outputs of the memories 11, 12, 13 and 14. The read reset signal RRE is further latched at the latch circuit 19 and then sent through the NOR circuit NR to the AND circuit AND in synchronism with the data clock CK, so that the AND circuit AND generates such a signal synchronized with the data clock CK as shown in FIG. 7(j). The output of the AND circuit AND is applied to the image memories 11, 12, 13 and 14 as the read clock RCK. In this case, since the read outputs of the image memories 11, 12, 13 and 14 are already reset by the read reset signal RRE, however, the image memories 11, 12, 13 and 14 generate no image signals.

When the read reset signal RRE rises from its low level to high level to release the read reset state of the image memories 11, 12, 13 and 14, the image memory 11 outputs an image data corresponding to the first image element "1", the image memory 12 outputs an image data corresponding to the second image element "2", the image memory 13 outputs an image data corresponding to the third image element "3", the image memory 14 outputs an image data corresponding to the fourth image element "4", in synchronism with the rising change of the output of the AND circuit AND (refer to FIG. 7(k)).

The outputs of the image memories 11, 12, 13 and 14, as well as the output (image element "0") of the latch circuit 20, are applied to the multiplexer 21.

When the read reset signal RRE rises from its low level to high to release the clear state of the latch circuit 17, the output of the adder 16 is latched at the latch circuit 17 in synchronism with the clock CK (refer to FIG. 7(a)) and the output of the latch circuit 17 is applied back to the input terminal B of the adder 16. As a result, the adder 16 starts its accumulating operation for a value corresponding to a hexadecimal "800" (refer to FIG. 7(c)).

When the accumulated value of the adder 16 exceeds the hexadecimal "1FFF" through the above accumulating operation of the adder 16, the adder outputs a carry signal "1" from its carry output terminal CO (refer to FIG. 7(d)). The carry signal "1" is sent to the AND circuit AND through the latch circuit 19, inverter IN and NOR circuit NR, which results in that the AND circuit AND generates such a pulse signal as shown in FIG. 7(j). The pulse signal is applied as the read clock RCK to the image memories 11, 12, 13 and 14 so that a data corresponding to the fifth image element "5", a data corresponding to the sixth image element "6", a data corresponding to the seventh image element "7" and a data corresponding to the eighth image element "8" are read out respectively from the image memories 11, 12, 13 and 14. Further, the output of the image memory 14, that is, the image data corresponding to the image element "4" in this case, is also latched at the latch circuit 20 under the control of the AND circuit AND. The image data read out from the image memories 11, 12, 13 and 14 are applied to the multiplexer 21, together with the image data corresponding to the fourth image element "4" latched at the latch circuit 20.

In this way, each time the accumulated value of the adder 16 exceeds the hexadecimal "1FFF" or in this case for every 4 clocks, image data are read out from the image memories 11, 12, 13 and 14 and then applied to the multiplexer 21, together with the image data latched at the latch circuit 20 and read out in the previous cycle from the image memory 14.

The multiplexer 21 functions to distribute the input signal to the output terminals DA and DB on the basis of the output signals YM12-1D and YM13-1D of the latch circuit 18 received at the control terminals $S_1$ and $S_2$ of the multiplexer 21. In this case, the signals YM12-1D and YM13-1D are signals obtained by delaying by an amount corresponding to one clock such signals YM12 and YM13 as shown in FIG. 7(f), and vary as shown in FIG. 7(g).

As a result, the multiplexer 21 sequentially outputs the image data corresponding to the image elements "0", "1", "2", ... from its output terminal DA and also sequentially outputs the image signals corresponding to the image elements "1", "2", "3", ... from its output terminal DB (refer to FIG. 7(l)).

The outputs DA and DB of the multiplexer 21 are applied to the ROMs 23 and 24 to cause the ROMs 23 and 24 and adder 25 to substantially perform an operation of $(a \times DA + b \times DB)$, where the coefficients a and b are determined by the signals YM10-2D and YM11-2D applied to the ROMs 23 and 24 as parts $A_1$ and $A_2$ of its addresses. In this connection, the signals YM10-2D and YM11-2D correspond to signals obtained by delaying by an amount corresponding to 2 clocks the outputs YM10 and YM11 of the latch circuit 17 through the latch circuits 18 and 22 (refer to FIG. (h)). In this case, it will be seen from FIG. 7(h) that the signals YM10-2D and YM11-2D are always "00". Thus, the coefficient a is set to be always 1, while the coefficient b is set to be always 0 (refer to FIG. 7(m)). As a result, the output of the adder 25 corresponds to a signal obtained by delaying the output signal of the multiplexer 21 from the output terminal DA by an amount corresponding to one clock. The output of the adder 25 is further delayed by one clock and issued from a latch circuit 26 as a scale-changed image data YMD (refer to FIG. 7(n)).

As will be clear from FIG. 7(n), the scale-changed image data YMD issued from the latch circuit 26 varies for every clock with respect to image element and the same as the original image data GXD applied to the image memories 11, 12, 13 and 14. In other words, this means that the original image input data GXD has been subjected to a 100% scale.

25% SCALING FACTOR

Figure 8:
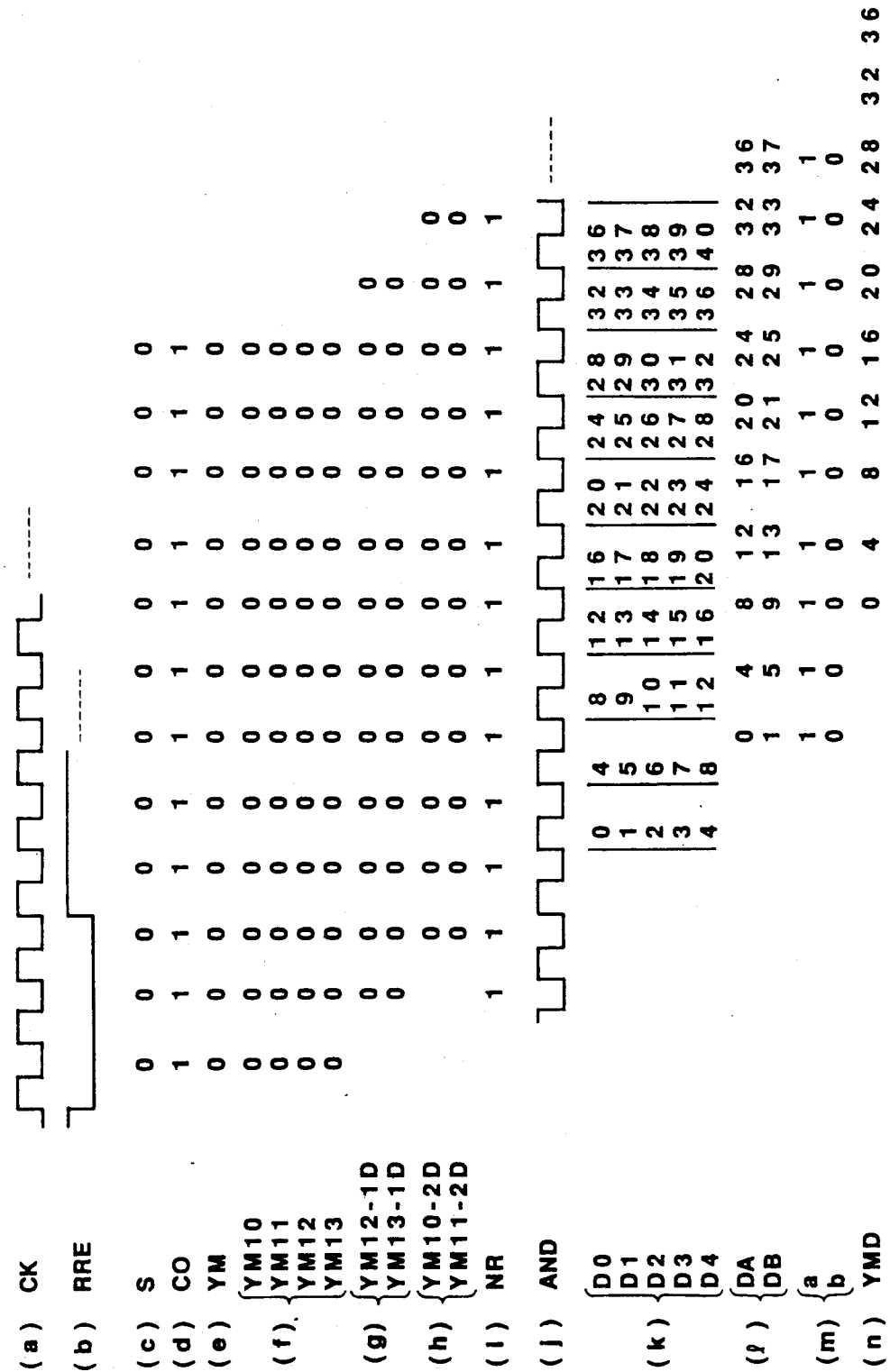

The operation of the system when the scaling factor is 25% is shown in FIG. 8. In this case, the scaling data MAG is set at a hexadecimal "1FFF" and thus a binary signal "1111111111111" of 13 bits corresponding to the "1FFF" is applied to the input terminal A of the adder 16. Accordingly, the adder 16 first outputs from the output terminal S a signal of all "0" corresponding to the addition of "1" to the binary signal (refer to FIG. 8(c)). In the adder 16, signals added to the hexadecimal "1FFF" by 1, after the read reset signal RRE has risen from its low level to the high level, are accumulated. Therefore, the adder 16 outputs the carry signal for every clock from the carry output terminal CO (refer to FIG. 8(d)) and the carry signal is then sent to the read clock input terminals of the image memories 11, 12, 13 and 14 through the latch circuit 19, inverter IN, NOR circuit NR and AND circuit AND, whereby image data are read out for every clock from the image memories 11, 12, 13 and 14 (refer to FIG. 8(k)).

At this time, the signals YM12-1D and YM13-1D applied to the control input terminals $S_1$ and $S_2$, as well as the signals YM10-2D and YM11-2D applied to the ROMs 23 and 24, are always all "0s". Accordingly, the multiplexer 21 guides the signal received at the input terminal $D_0$ to the output terminal DA and the signal received at the input terminal $D_1$ to the output terminal DB. This causes the multiplexer 21 to sequentially output image element data corresponding to image elements "0", "4", "8", ... from the output terminal DA, while causing multiplexer 21 to sequentially output image element data corresponding to image elements "1", "5", "9", ... from the output terminal DB (refer to FIG. 8(l)). The coefficients a and b are read out respectively from the ROMs 23 and 24 so that the adder 25 outputs the same data as is obtained by delaying by one clock the image data issued from the output terminal DA of the multiplexer 21. This output image data of the adder 25 is further delayed by one clock at the latch circuit 26 and then output therefrom as the scale-changed image data YMD (refer to FIG. 8(n)).

It will be seen from FIG. 8(n) that the scale-changed image data YMD issued from the latch circuit 26 is indicative of image data corresponding to one of every four image elements, such as the fourth image element "4", the eighth image element "8", ..., which corresponds to a data obtained by processing the original image data with a ¼ scale or 25% scaling factor.

400% SCALING FACTOR

Figure 9:
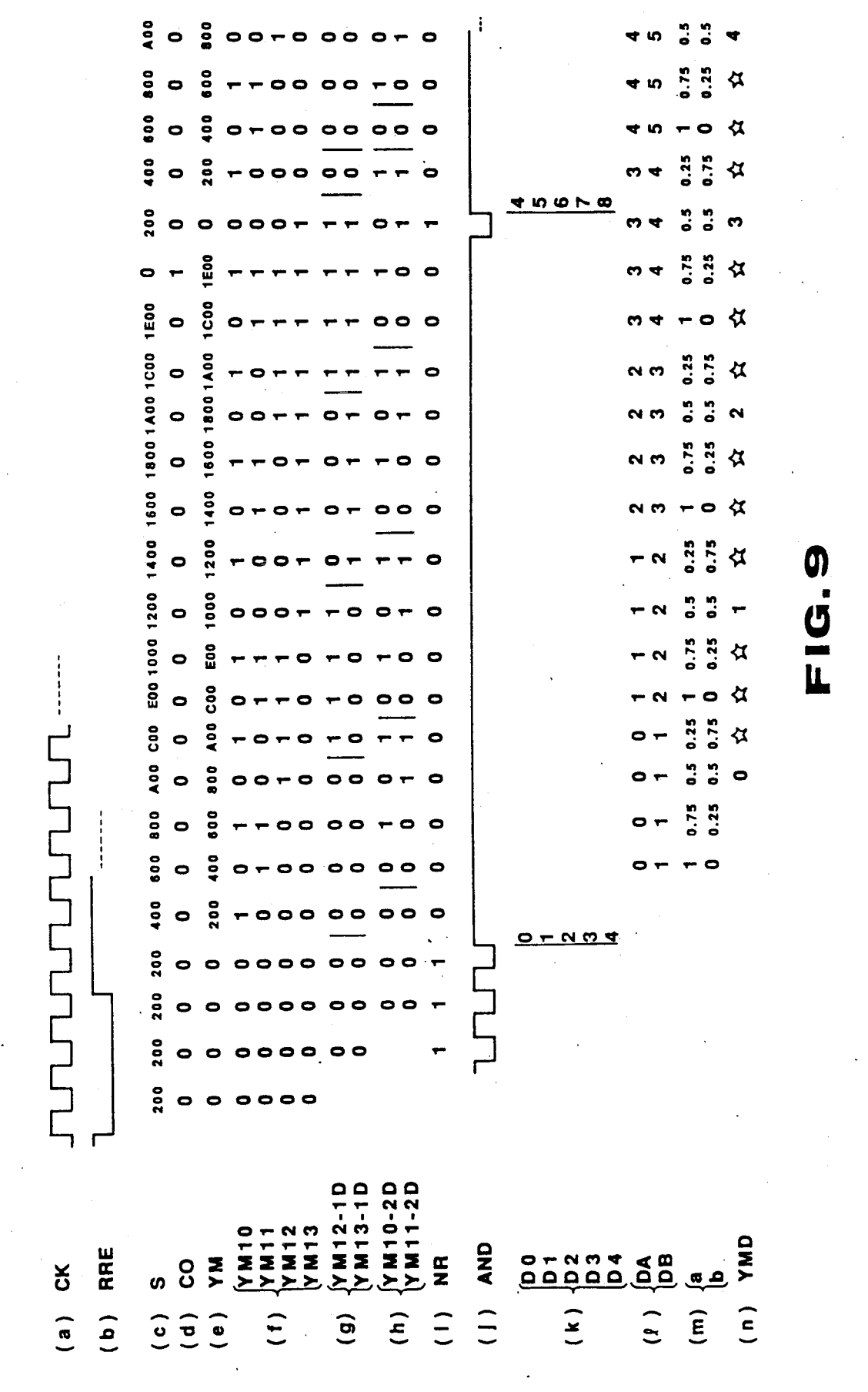

The operation of the system when the scaling factor is 400% is shown in FIG. 9. In this case, the scaling data MAG is set at a hexadecimal "1FF" and a binary signal of 13 bits "0000111111111" corresponding to the "1FF" is applied to the input terminal A of the adder 16. The adder 16 in turn substantially accumulates a value (1FF+1=200) corresponding to a hexadecimal addition of 1 to 1FF. The accumulated value of the adder 16 varies as shown by FIG. 9(c) and the adder 16 outputs one carry signal "1" for every 16 clocks from the output terminal CO (refer to FIG. 9(d)). The AND circuit AND generates the read clock RCK on the basis of the carry signal and the reading operation of image data from the image memories 11, 12, 13 and 14 is carried out on the basis of the read clock RCK (refer to FIG. 9(k)). Thus, in this case, one reading operation of image data from the image memories 11, 12, 13 and 14 is carried out for every 16 clocks.

Further, the signals YM12-1D and YM13-1D applied to the control terminals $S_1$ and $S_2$ vary as shown in FIG. 9(g), that is, in such a manner as to have "0" and "0", "1" and "0", "0" and "1", "1" and "1", ... at intervals of four clocks. Accordingly, an image data corresponding to the image element "0" during a period of the first four clocks, an image data corresponding to the image element "1" during a period of the second four clocks, an image data corresponding to the image element "2" for a period of the subsequent four clocks, and so on sequentially appear at the output terminal DA of the multiplexer 16. In this way, image data corresponding to the respective image elements appear as changed sequentially at intervals of four clocks. Similarly, an image data corresponding to the image element "1", an image data corresponding to the image element "2", and so on appear sequentially at intervals of four clocks at the output terminal DB of the multiplexer 16. In addition, the image data appearing at the output terminal DB leads the image data appearing at the output terminal DA by one image element.

The signals YM10-2D and YM11-2D applied to the ROMs 23 and 24 vary as shown in FIG. 9(h), that is, in such a manner as to have "0" and "0", "1" and "0", "0" and "1", "1" and "0.1", and so on at intervals of four clocks during which the multiplexer 16 generates the image data corresponding to the same image element. Therefore, the coefficients a and b of the ROMs 23 and 24 are varied as shown in FIG. 9(m), respectively. As a result, the image data issued from the output terminals DA and DB of the multiplexer 21 are subjected to an interpolating operation therebetween. That is, three image data DA1, DA2 and DA3 which follow are inserted between the image data from the output terminals DA and DB.

$0.75 \times DA + 0.25 \times DB = DA1$
$0.5 \times DA + 0.5 \times DB = DA2$
$0.25 \times DA + 0.75 \times DB = DA3$ FIG. 9(n) shows the scale-changed image data YMD issued from the latch circuit 26, in which marks ☆ denote the interpolated data expressed by the above expressions.

In this way, when the scale-changed image data YMD is expressed to be a hexadecimal "1FF", three interpolated image data are inserted between every two of the image data corresponding to the respective image elements. As a result, the scale-changed image data YMD output from the latch circuit 26 corresponds to a data obtained by magnifying the original image data 4 times or with a scaling factor of 400%.

35.4% Scaling Factor

Figure 10:
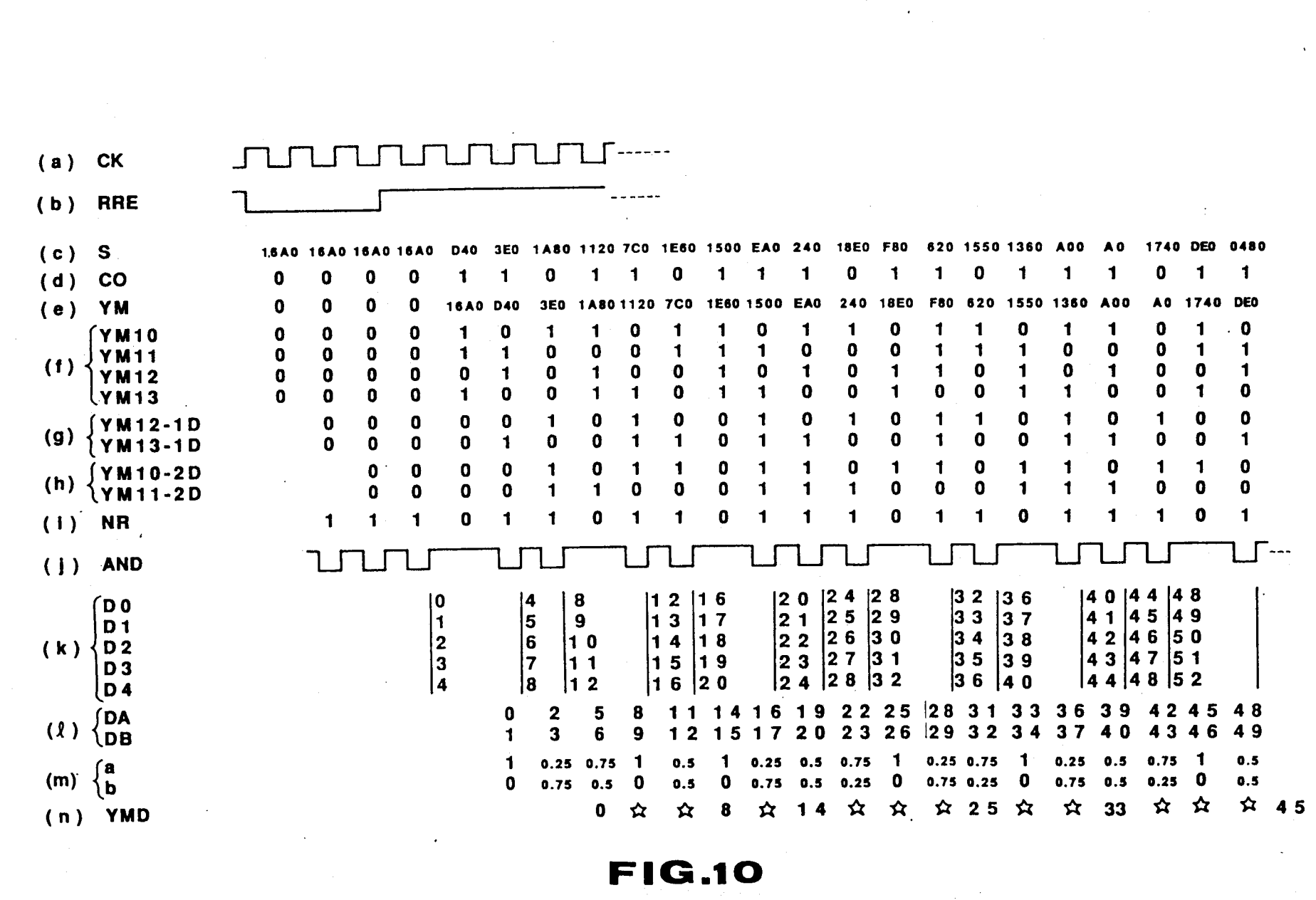

The operation of the system when the scaling factor is 35.4% is shown in FIG. 10. In this case, the scaling data MAG is set at a hexadecimal "169F" (corresponding to a binary data "1011010011111"). The adder 16, when receiving the binary data at its input terminal A, accumulates a value (169F+1) as shown in FIG. 10(c). In this case, a relation of 800/(169F+1)= 35.4 is satisfied so that the adder 16 outputs the carry signal from the output terminal CO each time the (169F+1)=16A0 exceeds the 1FFF (refer to to FIG. 10(d)).

The reading operation over the image memories 11, 12, 13 and 14 is controlled on the basis so the pulse signal (refer to FIG. 10(j)) generated from the AND circuit AND in response to the carry signal. FIG. 10(k) shows an output timing of image data read out from the image memories 11, 12, 13 and 14.

Shown in FIG. 10(g) are the signals YM12-1D and YM13-1D applied to the control input terminals $S_1$ and $S_2$ of the multiplexer 21. The signal distributing operation of the multiplexer 21 is controlled by these signals YM12-1D and YM13-1D received at the terminals $S_1$ and $S_2$ so that such image data corresponding to the image elements, as shown in FIG. 10(l), appear at the output terminals DA and DB of the mulitplexer 21.

FIG. 10(m) shows changes in the coefficients to be employed at the ROMs 23 and 24. The ROMs 23 and 24 and adder 25 perform an interpolating operation based on the data shown in FIG. 10(i l) and (b) and such interpolated result as shown in FIG. 10(n) is output from the latch circuit 26. As will be clear from FIG. 10(n), the image data interpolated by the image data of the image elements "2" and "3" and the image data interpolated by the image data of the image elements "5" and "6" are inserted between the image data of the image elements "0" and "8". Further, the image data interpolated by the image data of the image elements "11" and "12" is inserted between the image data of the image elements "8" and "14". Inserted between the image data of the image elements "14" and "25" are the image data interpolated by the image data of the image elements "16" and "17" as well as the image data interpolated by the image data of the image elements "22" and "23". Similarly, between the image data of the image elements "25" and "33" two interpolated image data are inserted; while between the image data of the image elements "33" and "45" three interpolated image data are inserted.

282.8% SCALING FACTOR

Figure 11:
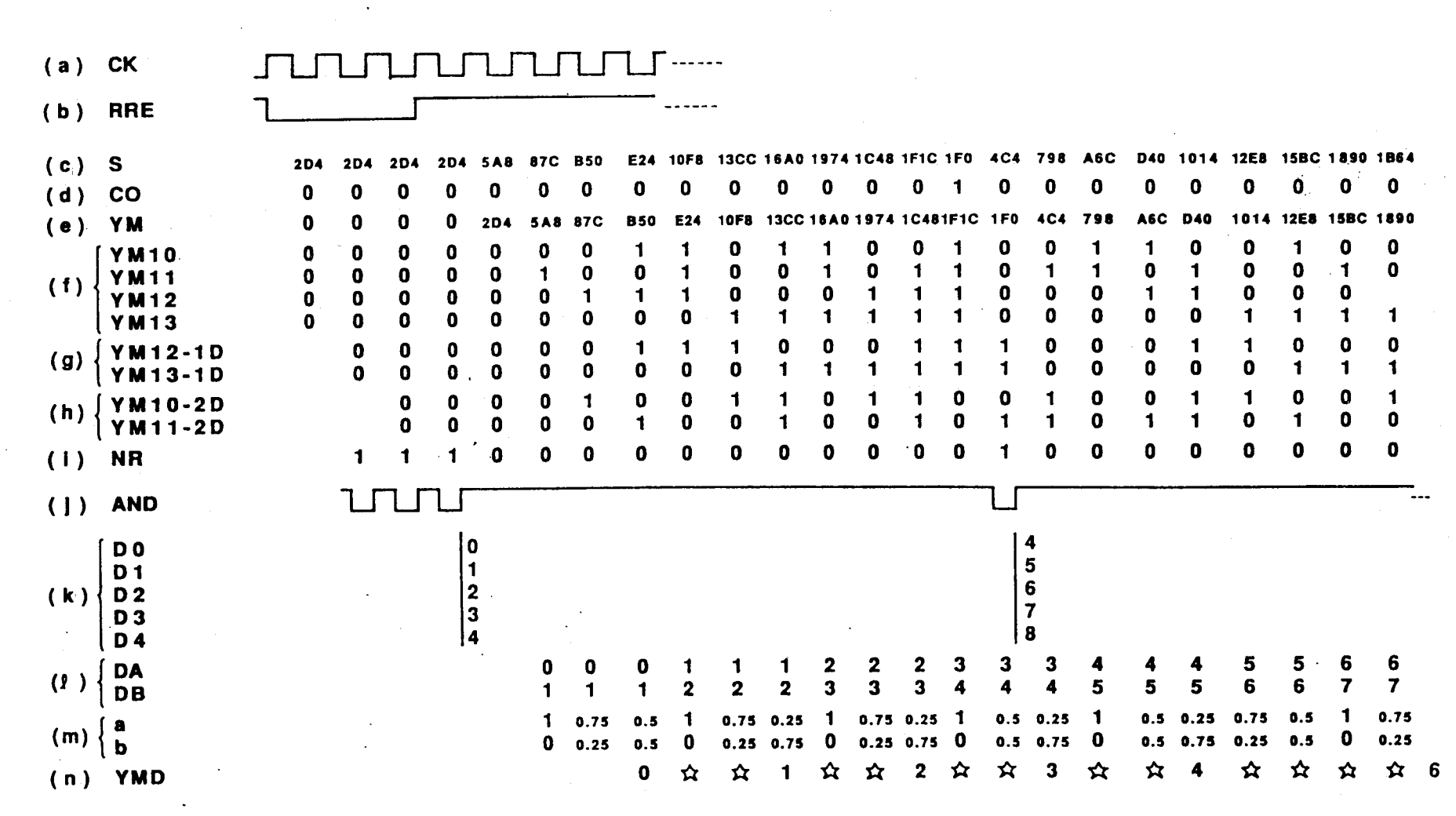

The operation of the system when the scaling factor is 282.8% is shown in FIG. 11. In this case, the scaling data MAG is set at a hexadecimal "2D3" (corresponding to a binary data "0001011010011"). This binary data is applied to the input terminal A of the adder 16 which in turn calculates or accumulates a value (2D3+1) as shown in FIG. 11(c). In this case, a relation of 800/(2D3+1)=282.8 is satisfied so that the adder 16 outputs the carry signal from the output terminal CO each time the value 2D3+1=2D4 exceeds the 1FFF (refer to FIG. 11(d)).

The reading operation over the image memories 11, 12, 13 and 14 is controlled by the pulse signal (refer to FIG. 11 (j)) generated from the AND circuit AND in response to the carry signal. The output timing of image data to be read out from the image memories 11, 12, 13 and 14 is shown in FIG. 11(k).

Shown in FIG. 11(g) are the signals YM12-1D and YM13-1D to be applied to the control input terminals $S_1$ and $S_2$ of the multiplexer 21. The signal distributing operation of the multiplexer 21 is controlled by the signals YM12-1D and YM13-1D received at the terminals $S_1$ and $S_2$, so that the multiplexer 21 outputs at the output terminals DA and DB such image data corresponding to image elements as shown in FIG. 11(l).

FIG. 11(m) shows changes in the coefficients to be employed at the ROMs 23 and 24. The ROMs 23 and 24 and adder 25 perform an interpolating operation based on the data shown in FIG. 11(l) and (b) and such interpolated result as shown in FIG. 11(n) is output from the latch circuit 26. In this case, it will be noted from FIG. 10(n) that two image data interpolated by the image data of the image elements "0" and "1" are inserted between the image data of the image elements "0" and "1", two image data interpolated by the image data of the image elements "1" and "2" are inserted between the image data of the image elements "1" and "2", two image data interpolated by the image data of the image elements "2" and "3" are inserted between the image data of the image elements "2" and "3", two image data interpolated by the image data of the image elements "3" and "4" are inserted between the image data of the image elements "3" and "4", three image data interpolated by the image data of the image elements "4" and "5" as well as one image data interpolated by the image data of the image elements "5" and "6" are inserted between the image data of the image elements "4" and "6".

Although the four FIFO memories have been provided in the foregoing embodiment, 2, 3 or more than 5 FIFO memories may be provided as necessary. In this case, the scaling range is changed by the number of FIFO memories employed, and the number of bits in the control signal to be applied to the control input terminal of the multiplexer 21, as well as the number of bits in the address signal to be applied to the ROMs 23 and 24 are also changed by the employed FIFO memory number.

In addition, the number of bits in the scaling data MAG to be applied to the adder 16 may be set to be an arbitrary value as required.

What is claimed is:

1. An image-data scaling system comprising:
   a plurality of memory means;
   distributing means for sequentially distributing original image data to sequentially write the original image data into said plurality of memory means;
   reading means for parallelly reading out image data stored in said plurality of memory means at a speed corresponding to a desired scaling factor;
   selection means for receiving the image data parallelly read out by said reading means from said plurality of memory means and selectively outputting two adjacent image data;
   first interpolation means for storing therein combinations of first interpolation coefficients, receiving one of the image data outputted from said selection means, multiplying the received image data by the first interpolation coefficients and outputting a multiplied value;
   second interpolation means for storing therein combinations of second interpolation coefficients, receiving the other one of the image data outputted from said selection means, multiplying the received image data by the second interpolation coefficients and outputting a multiplied value; and image-data forming means for forming scale-changed image data corresponding to an image having the desired scaling factor by adding together outputs of said first and second interpolation means.

2. An image-data scaling system as set forth in claim 1, wherein said memory means comprises a first-in first-out memory.

3. An image-data scaling system as set forth in claim 1, wherein said distributing means sequentially distributes the original image data in synchronism with an original image clock to sequentially write the original image data into said plurality of memory means.

4. An image-data scaling system as set forth in claim 1, wherein said distributing means includes a decoder which receives and decodes a signal of a plurality of bits changing in synchronism with an original image clock and which sequentially generates write control signals for said plurality of memory means.

5. An image-data scaling system as set forth in claim 1, wherein said reading means includes input means for inputting numeral data corresponding to the desired scaling factor, accumulation means for accumulating the numeral data inputted by said input means at a predetermined speed, and means for forming a read clock used for controlling parallel reading operation of said plurality of memory means on the basis of a carry signal of said accumulation means.

6. An image-data scaling system comprising:
a plurality of memory means;
distributing means for sequentially distributing original image data to sequentially write the original image data into said plurality of memory means;
input means for inputting numeral data corresponding to a desired scaling factor;
accumulation means for accumulating the numeral data inputted by said input means at a predetermined speed;
clock forming means for forming a read clock used for controlling parallel reading operation of said plurality of memory means on the basis of a carry signal of said accumulation means;
reading means for parallelly reading out the image data stored in said plurality of memory means on the basis of the clock formed by said clock forming means; and
image-data forming means for forming scale-changed image data corresponding to an image having the desired scaling factor on the basis of the image data read out by said reading means.

7. An image-data scaling system as set forth in claim 6, wherein said image-data forming means includes image-data extracting means for extracting a part or whole of the image data parallelly read out by said reading means from said plurality of memory means in accordance with the desired scaling factor, and image-data inserting means for interpolating the image data parallelly read out by said reading means from said plurality of memory means in accordance with the desired scaling factor to form interpolation image data and for inserting the interpolation image data between the image data extracted by said image-data extracting means.

8. An image-data scaling system as set forth in claim 7, wherein said image-data inserting means includes two-data extracting means for extracting any adjacent two of the image data read out from said reading means and interpolated-data forming means for interpolating the two image data extracted by said two-data extracting means to form the interpolation image data.

9. An image-data scaling system as set forth in claim 6, wherein said image-data forming means includes a multiplexer for receiving the image data parallelly read out by said reading means from said plurality of memory means and for selectively outputting two adjacent image data, a first interpolation memory for storing therein combinations of first interpolation coefficients and for receiving one of the image data issued from said multiplexer, multiplying the received image data by the first interpolation coefficients and outputting a multiplied value, a second interpolation memory for storing therein combinations of second interpolation coefficients and for receiving the other one of the image data issued from said multiplexer, multiplying the received image data by the second interpolation coefficients and outputting a multiplied value, and addition means for adding together outputs of said first and second interpolation memories.

10. An image-data scaling system comprising:
a plurality of memory means;
distributing means for sequentially distributing original image data in synchronism with an original image clock to sequentially write the original image data into said plurality of memory means;
accumulation means for accumulating numeral data corresponding to a desired scaling factor at a predetermined speed;
reading means for controlling parallel reading operation of said plurality of memory means in response to a carry signal of said accumulation means;
a multiplexer for receiving the image data parallelly read out by said reading means from said plurality of memory means and sequentially and selectively outputting two adjacent image data in response to values of predetermined bits in an accumulated value of said accumulation means;
a first interpolation memory for storing therein combinations of first interpolation coefficients and for receiving one of the image data issued from said multiplexer, multiplying the received image data by a first interpolation coefficient selected from the combinations of the first interpolation coefficients in accordance with the predetermined bits in the accumulated value of said accumulation means and outputting a multiplied value;
a second interpolation memory for storing therein combinations of second interpolation coefficients and for receiving the other one of the image data issued from said multiplexer, multiplying the received image data by a second interpolation coefficient selected from the combinations of the second interpolation coefficients in accordance with values of bits following the predetermined bits in the accumulated value of said accumulation means and outputting a multiplied value; and
addition means for adding together outputs of said first and second interpolation memories.

11. An image-data scaling system as set forth in claim 10, wherein said memory means comprises a first-in first-out memory.

12. An image-data scaling system as set forth in claim 10, wherein said distributing means includes a decoder which receives and decodes a signal of a plurality of bits changing in synchronism with an original image clock and which sequentially generates write control signals for said plurality of memory means.

13. An image-data scaling system as set forth in claim 6, wherein said memory means comprises a first-in first-out memory.

14. An image-data scaling system as set forth in claim 6, wherein said distribution means sequentially distributes the original image data in synchronism with an original image clock to sequentially write the original image data into said plurality of memory means.

15. An image-data scaling system as set forth in claim 6, wherein said distribution means includes a decoder which receives and decodes a signal of a plurality of bits changing in synchronism with an original image clock and which sequentially generates write control signals for said plurality of memory means.

16. An image-data scaling method comprising the steps of:

Sequentially distributing original image data in synchronism with an original image clock to sequentially write the original image data into a plurality of memory means;

accumulating numeral data corresponding to a desired scaling factor at a predetermined speed;

parallelly reading out the image data stored in said plurality of memory means in response to a carry signal obtained in said accumulating step;

receiving the image data parallelly read out from said plurality of memory means and sequentially and selectively outputting two adjacent image data in response to values of the predetermined bits in the accumulated values obtained in said accumulating step;

receiving one of the two adjacent image data and outputting a first interpolation value obtained by multiplying the received one of the image data by a first interpolation coefficient selected in response to the predetermined bits in the accumulated values;

receiving the other one of the two adjacent image data and outputting a second interpolation value obtained by multiplying the received other one of the image data by a second interpolation coefficient selected in reaponse to bit values following the predetermined bits in the accumulated values; and adding the first and second interpolation values to form scale-changed image data corresponding to an image having the desired scaling factor.

* * * * *